US007680566B2

(12) United States Patent
Liberatore

(10) Patent No.: US 7,680,566 B2
(45) Date of Patent: Mar. 16, 2010

(54) SYSTEM AND METHOD FOR CONTROLLING HORSEPOWER IN A LOCOMOTIVE CONSIST

(75) Inventor: Aldo Liberatore, London (CA)

(73) Assignee: ZTR Control Systems, London (CA)

( * ) Notice: Subject to any disclaimer, the term of this patent is extended or adjusted under 35 U.S.C. 154(b) by 333 days.

(21) Appl. No.: 11/848,946

(22) Filed: Aug. 31, 2007

(65) Prior Publication Data

US 2008/0147256 A1 Jun. 19, 2008

Related U.S. Application Data

(60) Provisional application No. 60/870,506, filed on Dec. 18, 2006.

(51) Int. Cl.
*G05D 1/00* (2006.01)

(52) U.S. Cl. ........................ 701/19; 105/61; 246/187 R

(58) Field of Classification Search ................. 246/186, 246/187 R; 105/61; 701/19
See application file for complete search history.

(56) References Cited

U.S. PATENT DOCUMENTS 4,344,364 A 8/1982 Nickles et al.
6,691,957 B2 * 2/2004 Hess et al. .................. 246/186
2006/0138285 A1 * 6/2006 Oleski et al. ............ 246/167 R
2006/0266256 A1 * 11/2006 Donnelly et al. .............. 105/61
2008/0296970 A1 * 12/2008 Donnelly et al. ............. 307/9.1

* cited by examiner

*Primary Examiner*—Mark Hellner
(74) *Attorney, Agent, or Firm*—Brett J. Slaney; John R. S. Orange; Blake, Cassels & Graydon LLP

(57) ABSTRACT

A consist controller is provided that enables an operator to take advantage of all horsepower combinations for locomotives in a consist. The consist controller provides a fractional increase option and a fractional decrease option that enables the operator to increase or decrease horsepower output with finer adjustments. In a preferred implementation, the fractional increases and decreases are used in conjunction with a fuel optimization routine such that the target setpoint, from which a range of horsepower values is computed, can be increased or decreased in steps that are less than a full notch increase or decrease.

22 Claims, 5 Drawing Sheets

ISOLATED LEAD UNIT AND TRAINLINE CONTROL

| | Trail (4,000 HP Locomotive) | | | Lead (4,000 HP Locomotive) | | | Consist | |
|---|---|---|---|---|---|---|---|---|
| | Notch | Hp | gl/Hr | Notch | Hp | gl/Hr | Hp | Hp Hr/gallon |
| 1 | Idle | 0 | 2.8 | Idle | 0 | 2.8 | 0 | n/a |
| 2 | Idle | 0 | 2.8 | 1 | 113 | 12 | 113 | 7.64 |
| 3 | 1 | 113 | 12 | Idle | 0 | 2.8 | 113 | 7.64 |
| 4 | 1 | 113 | 12 | 1 | 113 | 12 | 226 | 9.42 |
| 5 | Idle | 0 | 2.8 | 2 | 405 | 27 | 405 | 13.59 |
| 6 | 2 | 405 | 27 | Idle | 0 | 2.8 | 405 | 13.59 |
| 7 | 1 | 113 | 12 | 2 | 405 | 27 | 518 | 13.28 |
| 8 | 2 | 405 | 27 | 1 | 113 | 12 | 518 | 13.28 |
| 9 | 2 | 405 | 27 | 2 | 405 | 27 | 810 | 15.00 |
| 10 | Idle | 0 | 2.8 | 3 | 905 | 55 | 905 | 15.66 |
| 11 | 3 | 905 | 55 | Idle | 0 | 2.8 | 905 | 15.66 |
| 12 | 1 | 113 | 12 | 3 | 905 | 55 | 1018 | 15.19 |
| 13 | 3 | 905 | 55 | 1 | 113 | 12 | 1018 | 15.19 |
| 14 | 2 | 405 | 27 | 3 | 905 | 55 | 1310 | 15.98 |
| 15 | 3 | 905 | 55 | 2 | 405 | 27 | 1310 | 15.98 |
| 16 | Idle | 0 | 2.8 | 4 | 1357 | 76 | 1357 | 17.22 |
| 17 | 4 | 1357 | 76 | Idle | 0 | 2.8 | 1357 | 17.22 |
| 18 | 1 | 113 | 12 | 4 | 1357 | 76 | 1470 | 16.70 |
| 19 | 4 | 1357 | 76 | 1 | 113 | 12 | 1470 | 16.70 |
| 20 | 2 | 405 | 27 | 4 | 1357 | 76 | 1762 | 17.11 |
| 21 | 4 | 1357 | 76 | 2 | 405 | 27 | 1762 | 17.11 |
| 22 | 3 | 905 | 55 | 3 | 905 | 55 | 1810 | 16.45 |
| 23 | Idle | 0 | 2.8 | 5 | 1980 | 107 | 1980 | 18.03 |
| 24 | 5 | 1980 | 107 | Idle | 0 | 2.8 | 1980 | 18.03 |
| 25 | 1 | 113 | 12 | 5 | 1980 | 107 | 2093 | 17.59 |
| 26 | 5 | 1980 | 107 | 1 | 113 | 12 | 2093 | 17.59 |
| 27 | 3 | 905 | 55 | 4 | 1357 | 76 | 2262 | 17.27 |
| 28 | 4 | 1357 | 76 | 3 | 905 | 55 | 2262 | 17.27 |
| 29 | 2 | 405 | 27 | 5 | 1980 | 107 | 2385 | 17.80 |
| 30 | 5 | 1980 | 107 | 2 | 405 | 27 | 2385 | 17.80 |
| 31 | Idle | 0 | 2.8 | 6 | 2663 | 140 | 2663 | 18.65 |
| 32 | 6 | 2663 | 140 | Idle | 0 | 2.8 | 2663 | 18.65 |
| 33 | 4 | 1357 | 76 | 4 | 1357 | 76 | 2714 | 17.86 |
| 34 | 1 | 113 | 12 | 6 | 2663 | 140 | 2776 | 18.26 |
| 35 | 6 | 2663 | 140 | 1 | 113 | 12 | 2776 | 18.26 |
| 36 | 3 | 905 | 55 | 5 | 1980 | 107 | 2885 | 17.81 |
| 37 | 5 | 1980 | 107 | 3 | 905 | 55 | 2885 | 17.81 |
| 38 | 2 | 405 | 27 | 6 | 2663 | 140 | 3068 | 18.37 |
| 39 | 6 | 2663 | 140 | 2 | 405 | 27 | 3068 | 18.37 |
| 40 | 4 | 1357 | 76 | 5 | 1980 | 107 | 3337 | 18.23 |
| 41 | 5 | 1980 | 107 | 4 | 1357 | 76 | 3337 | 18.23 |
| 42 | Idle | 0 | 2.8 | 7 | 3367 | 172 | 3367 | 19.26 |
| 43 | 7 | 3367 | 172 | Idle | 0 | 2.8 | 3367 | 19.26 |
| 44 | 1 | 113 | 12 | 7 | 3367 | 172 | 3480 | 18.91 |
| 45 | 7 | 3367 | 172 | 1 | 113 | 12 | 3480 | 18.91 |
| 46 | 3 | 905 | 55 | 6 | 2663 | 140 | 3568 | 18.30 |
| 47 | 6 | 2663 | 140 | 3 | 905 | 55 | 3568 | 18.30 |
| 48 | 2 | 405 | 27 | 7 | 3367 | 172 | 3772 | 18.95 |
| 49 | 7 | 3367 | 172 | 2 | 405 | 27 | 3772 | 18.95 |
| 50 | Idle | 0 | 2.8 | 8 | 3928 | 210 | 3928 | 18.46 |
| 51 | 8 | 3928 | 210 | Idle | 0 | 2.8 | 3928 | 18.46 |
| 52 | 5 | 1980 | 107 | 5 | 1980 | 107 | 3960 | 18.50 |
| 53 | 4 | 1357 | 76 | 6 | 2663 | 140 | 4020 | 18.61 |
| 54 | 6 | 2663 | 140 | 4 | 1357 | 76 | 4020 | 18.61 |
| 55 | 1 | 113 | 12 | 8 | 3928 | 210 | 4041 | 18.20 |
| 56 | 8 | 3928 | 210 | 1 | 113 | 12 | 4041 | 18.20 |
| 57 | 3 | 905 | 55 | 7 | 3367 | 172 | 4272 | 18.82 |
| 58 | 7 | 3367 | 172 | 3 | 905 | 55 | 4272 | 18.82 |
| 59 | 2 | 405 | 27 | 8 | 3928 | 210 | 4333 | 18.28 |
| 60 | 8 | 3928 | 210 | 2 | 405 | 27 | 4333 | 18.28 |
| 61 | 5 | 1980 | 107 | 6 | 2663 | 140 | 4643 | 18.80 |
| 62 | 6 | 2663 | 140 | 5 | 1980 | 107 | 4643 | 18.80 |
| 63 | 4 | 1357 | 76 | 7 | 3367 | 172 | 4724 | 19.05 |
| 64 | 7 | 3367 | 172 | 4 | 1357 | 76 | 4724 | 19.05 |
| 65 | 3 | 905 | 55 | 8 | 3928 | 210 | 4833 | 18.24 |
| 66 | 8 | 3928 | 210 | 3 | 905 | 55 | 4833 | 18.24 |
| 67 | 4 | 1357 | 76 | 8 | 3928 | 210 | 5285 | 18.48 |
| 68 | 8 | 3928 | 210 | 4 | 1357 | 76 | 5285 | 18.48 |
| 69 | 6 | 2663 | 140 | 6 | 2663 | 140 | 5326 | 19.02 |
| 70 | 5 | 1980 | 107 | 7 | 3367 | 172 | 5347 | 19.16 |
| 71 | 7 | 3367 | 172 | 5 | 1980 | 107 | 5347 | 19.16 |
| 72 | 5 | 1980 | 107 | 8 | 3928 | 210 | 5908 | 18.64 |
| 73 | 8 | 3928 | 210 | 5 | 1980 | 107 | 5908 | 18.64 |
| 74 | 6 | 2663 | 140 | 7 | 3367 | 172 | 6030 | 19.33 |
| 75 | 7 | 3367 | 172 | 6 | 2663 | 140 | 6030 | 19.33 |
| 76 | 6 | 2663 | 140 | 8 | 3928 | 210 | 6591 | 18.83 |
| 77 | 8 | 3928 | 210 | 6 | 2663 | 140 | 6591 | 18.83 |
| 78 | 7 | 3367 | 172 | 7 | 3367 | 172 | 6734 | 19.58 |
| 79 | 7 | 3367 | 172 | 8 | 3928 | 210 | 7295 | 19.10 |
| 80 | 8 | 3928 | 210 | 7 | 3367 | 172 | 7295 | 19.10 |
| 81 | 8 | 3928 | 210 | 8 | 3928 | 210 | 7856 | 18.70 |

Figure 3

| Trail Throttle | Lead Throttle | Consist HP | HP-hrs/ gallon |
|---|---|---|---|
| 4 | 4 | 2714 | 17.86 |
| 1 | 6 | 2776 | 18.26 |
| 6 | 1 | 2776 | 18.26 |
| 3 | 5 | 2885 | 17.81 |
| 5 | 3 | 2885 | 17.81 |
| 2 | 6 | 3068 | 18.37 |
| 6 | 2 | 3068 | 18.37 |
| 4 | 5 | 3337 | 18.23 |
| 5 | 4 | 3337 | 18.23 |
| Idle | 7 | 3367 | 19.26 |
| 7 | Idle | 3367 | 19.26 |
| 1 | 7 | 3480 | 18.91 |
| 7 | 1 | 3480 | 18.91 |
| 3 | 6 | 3568 | 18.30 |
| 6 | 3 | 3568 | 18.30 |
| 2 | 7 | 3772 | 18.95 |
| 7 | 2 | 3772 | 18.95 |
| Idle | 8 | 3928 | 18.46 |
| 8 | Idle | 3928 | 18.46 |
| 5 | 5 | 3960 | 18.50 |

60

62

SYSTEM AND METHOD FOR CONTROLLING HORSEPOWER IN A LOCOMOTIVE CONSIST

This application claims priority from U.S. Provisional Application No. 60/870,506 filed on Dec. 18, 2006, the contents of which are incorporated herein by reference.

FIELD OF THE INVENTION

The present invention relates to control systems for locomotive consists and has particular utility in controlling horsepower in such consists.

DESCRIPTION OF THE PRIOR ART

The horsepower output of freight locomotives has increased in recent history, often producing in the range of 4000-6000 Hp. The advantages of a higher output are many and well known, including the ability to carry a similar load with fewer locomotives, and a higher fuel efficiency. One disadvantage of higher output locomotives is that, in order to comply with existing interchange standards, the horsepower is controlled using eight throttle or "notch" positions and, therefore, the incremental increase in horsepower per notch setting becomes greater as horsepower per unit increases. Table 1 below illustrates approximate horsepower output for each throttle setting for a typical 4000 Hp locomotive.

TABLE 1

Horsepower control settings for a typical 4000 Hp locomotive

| Throttle Setting | Horsepower per Locomotive | Difference in Hp Between Throttle Settings |
|---|---|---|
| Throttle 8 | 3928 | |
| | | 561 |
| Throttle 7 | 3367 | |
| | | 704 |
| Throttle 6 | 2663 | |
| | | 683 |
| Throttle 5 | 1980 | |
| | | 623 |
| Throttle 4 | 1357 | |
| | | 452 |
| Throttle 3 | 905 | |
| | | 500 |
| Throttle 2 | 405 | |
| | | 292 |
| Throttle 1 | 113 | |
| | | 113 |
| Idle | 0 | |

It can be seen from table 1 that the step change in horsepower as the operator moves from one throttle setting to the next can be relatively significant. For example, in moving from notch 6 to notch 7, an additional 704 Hp is added. The step change is, predictably, even more significant with higher horsepower locomotives.

In a locomotive consist, where two or more locomotives are connected so as to operate as a single overall unit, the step change in horsepower output as the operator changes throttle settings is even more pronounced as shown in Tables 2 and 3 below.

TABLE 2

Horsepower control settings for a two-unit consist

| Throttle Setting | Horsepower per Locomotive | Two Unit Consist Horsepower | Difference in Hp between Throttle Positions |
|---|---|---|---|
| Throttle 8 | 3928 | 7856 | |
| | | | 1122 |
| Throttle 7 | 3367 | 6734 | |
| | | | 1408 |
| Throttle 6 | 2663 | 5326 | |
| | | | 1366 |
| Throttle 5 | 1980 | 3960 | |
| | | | 1246 |
| Throttle 4 | 1357 | 2714 | |
| | | | 904 |
| Throttle 3 | 905 | 1810 | |
| | | | 1000 |
| Throttle 2 | 405 | 810 | |
| | | | 584 |
| Throttle 1 | 113 | 226 | |
| | | | 226 |
| Idle | 0 | 0 | |

TABLE 3

Horsepower control settings for a three-unit consist

| Throttle Setting | Horsepower per Locomotive | Three Unit Consist Horsepower | Difference in Hp between Throttle Positions |
|---|---|---|---|
| Throttle 8 | 3928 | 11784 | |
| | | | 1683 |
| Throttle 7 | 3367 | 10101 | |
| | | | 2112 |
| Throttle 6 | 2663 | 7989 | |
| | | | 2049 |
| Throttle 5 | 1980 | 5940 | |
| | | | 1869 |
| Throttle 4 | 1357 | 4071 | |
| | | | 1356 |
| Throttle 3 | 905 | 2715 | |
| | | | 1500 |
| Throttle 2 | 405 | 1215 | |
| | | | 876 |
| Throttle 1 | 113 | 339 | |
| | | | 339 |
| Idle | 0 | 0 | |

The above tables exemplify the approximate step increases for a 4000 Hp locomotive and it can be appreciated that different models and combinations will result in different settings. However, it can be seen that as more and more locomotives are combined in a consist, the coarseness of the horsepower control becomes more evident.

It is therefore an object of the following to obviate or mitigate the above described disadvantages.

SUMMARY OF THE INVENTION

In one aspect, there is provided, a method for controlling horsepower output in a consist of at least two locomotives comprising receiving an input indicative of a requested incremental change in horsepower; determining a current horsepower output for the consist and a current notch combination for the at least two locomotives generating the current horsepower; determining a next notch combination for the at least two locomotives in the direction of the incremental change having associated therewith, an expected horsepower output; determining a target horsepower output which is between the expected horsepower output and the current horsepower output according to the incremental change; referencing a set of one or more transitional horsepower outputs at alternative notch combinations and determining a desired one of the alternative notch combinations having a corresponding transitional horsepower output which is within a predetermined range of the target horsepower; and adjusting throttle notch positions in each the at least two locomotives according to the desired one of the alternative notch combinations.

In another aspect, there is provided a computer readable medium comprising computer executable instructions thereon for causing a processor in a control system to perform the above method.

In yet another aspect, there is provided, a system for controlling horsepower output in a consist of at least two locomotives, the system comprising a controller connected to each the at least two locomotives and capable of controlling notch positions thereof, the controller comprising a processor configured to execute computer readable instructions to cause the controller to, receive an input indicative of a requested incremental change in horsepower; determine a current horsepower output for the consist and a current notch combination for the at least two locomotives generating the current horsepower; determine a next notch combination for the at least two locomotives in the direction of the incremental change having associated therewith, an expected horsepower output; determine a target horsepower output which is between the expected horsepower output and the current horsepower Output according to the incremental change; reference a set of one or more transitional horsepower outputs at alternative notch combinations and determine a desired one of the alternative notch combinations having a corresponding transitional horsepower output which is within a predetermined range of the target horsepower, the set being accessible to the controller; and adjust throttle notch positions in each the at least two locomotives according to the desired one of the alternative notch combinations.

BRIEF DESCRIPTION OF THE DRAWINGS

An embodiment of the invention will now be described by way of example only with reference to the appended drawings wherein:

FIG. 3 is a table showing horsepower and fuel efficiency data for various throttle notch combinations for the two-unit locomotive consist of FIG. 2.

DETAILED DESCRIPTION OF THE INVENTION

Figure 1:
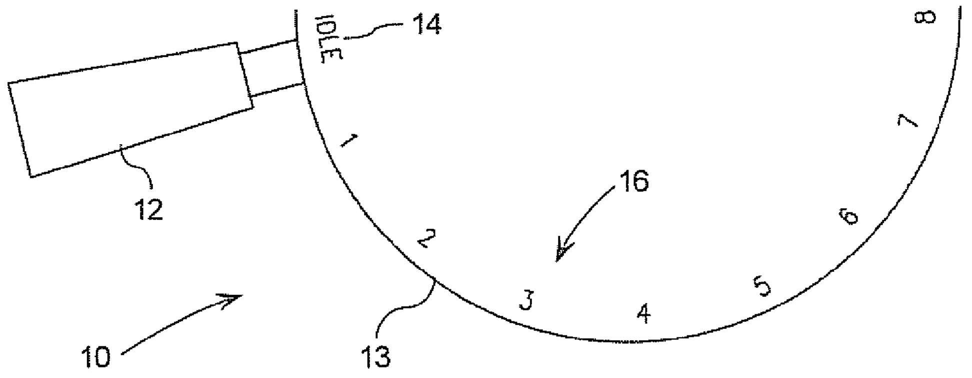
FIG. 1 is a schematic diagram of a throttle controller for a locomotive.

Referring to FIG. 1, a throttle controller 10 for a locomotive (not shown) comprises a throttle handle 12 supported by a control stand 11, an idle position 14, and eight throttle settings 16 provided by the control stand 13. The throttle settings may also be referred to herein as notch 1, notch 2, etc. Typically, there is a spring loaded cam (not shown) integrated with the throttle handle 12 that positions the throttle handle 12 securely into physical notches in the control stand 13, hence the term "notch". As such, it will be appreciated that the terms "throttle position" and "notch position" are interchangeable.

When the throttle handle 12 is placed in the idle position 14, no tractive effort is generated by the locomotive. Notch 8 provides the maximum horsepower output for the locomotive. Notch 1 through notch 7 are interval steps in horsepower between zero (0) and maximum horsepower achieved by selecting notch 8.

Figure 2:
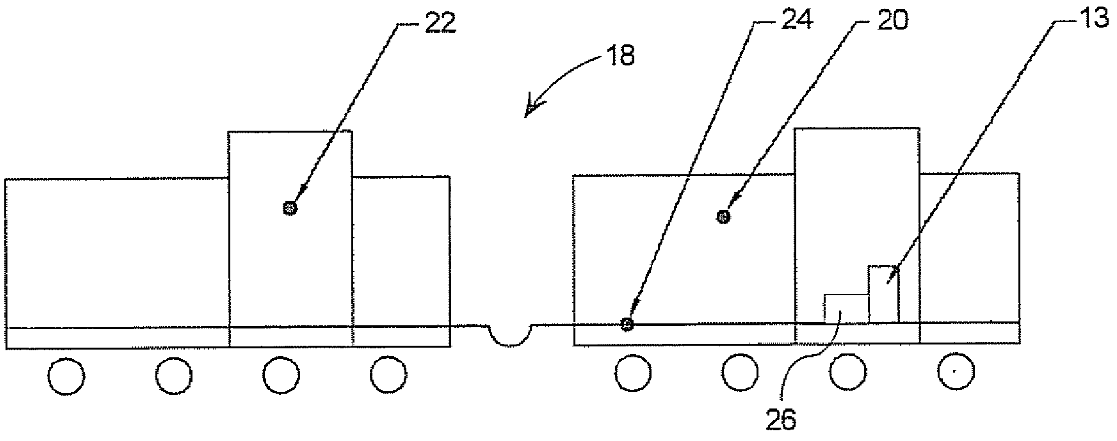
FIG. 2 is a schematic diagram of a two-unit locomotive consist.

FIG. 2 illustrates a two-unit locomotive consist 18, comprising a lead locomotive 20 and a trailing locomotive 22. It will be appreciated that the two-unit consist 18 is shown for illustrative purposes and for ease of explanation, and that the following principles can be extended for controlling other consists comprising more locomotive units.

An operator in the lead locomotive 20 controls all the locomotives in the consist 18 (in this example two) using the control stand 13. The lead locomotive 20 is connected electrically to the trailing locomotive 22 via a group of cables known as a trainline 24. Electrical signals generated by the control stand 13 for the control of the locomotives 20, 22 are paralleled with the cables in the trainline 24. It is generally accepted that every modern locomotive has a trainline 24 that conforms to standards established by applicable authorities. Performance measures such as locomotive direction, dynamic braking effort and throttle settings are typically controlled via the trainline 24. Traditionally, the trailing locomotive 22 is controlled by responding to the same commands as the lead locomotive 20 via the trainline 24.

For example, when the operator changes the throttle handle position from notch 2 to notch 3 in the lead locomotive 20, the throttle position in the trailing locomotive 22 also changes from notch 2 to notch 3. This leads to the coarseness described above and in particular exemplified in table 2 where the step increase from notch 2 to notch 3 is 1000 Hp. It can be appreciated that for a three-unit consist, the step increase is even coarser as shown in table 3.

It can be appreciated that the large step increases can be detrimental to fuel economy as, often, more horsepower than is required is output. In these situations, the operator may be required to cycle between two different notch positions 16 in order to achieve a certain overall average speed. A consist controller 26 may be used with the consist 18, which individually selects throttle positions for each locomotive 20, 22 in the consist 18. The controller 26 may be used to achieve different levels of horsepower output and/or to choose combinations that optimize fuel efficiency.

Preferably, the controller 26 stores a fuel consumption profile of every locomotive model that it may need to interface with, and from these profiles, a database is developed with every possible combination of throttle setting as exemplified in FIG. 3 for a two-unit consist 18 comprising 4000 Hp locomotives. Each notch setting combination has a corresponding horsepower and efficiency for the entire consist 18. Either manually or automatically, an optimal efficiency can be chosen that can simultaneously achieve a desired horsepower chosen by the operator.

In operation, when the operator moves the throttle handle 12 to a desired notch position 16, the controller 26 calculates the horsepower that is being requested for that notch position 16. The controller 26 may then review the database for every possible throttle combination that can achieve this targeted horsepower within a pre-determined range. From this "short list" of possible combinations, the corresponding fuel efficiencies are reviewed, and the most fuel efficient combination is then typically chosen. The combination indicates a notch position 16 for each locomotive (20, 22), and the controller 26 then instructs each locomotive 20, 22 individually. In some cases, each locomotive 20, 22 operates at the same notch position 16, and in other cases each locomotive 20, 22 operates at a different notch position 16. Details of such a fuel optimization system are provided in U.S. Pat. No. 4,344,364 to Nickles et al. published on Aug. 17, 1982, the contents of which are incorporated herein by reference.

The bolded lines in FIG. 3 show how the consist 18 would normally work when the throttle positions 16 change in tandem as described above. As can be seen from FIG. 3, the consist 18 (with two units) can operate at up to eighty-one (81) different notch combinations. Having individual control of the throttle positions for each locomotive (20, 22), and using data such as that shown in FIG. 3, opportunities for improved train handling and fuel efficiencies can be achieved, in particular to overcome the disadvantages associated with the coarse horsepower step increases and decreases.

For example, as shown in tables 2 and 3, there is a coarse granularity in horsepower control when two or more locomotives are combined. Referring to table 2, when changing from notch 6 where the consist 18 outputs approximately 5236 Hp, to notch 7 where the consist would then output approximately 6,734 Hp, an increase of 1408 Hp or approximately 26.4% can be experienced. Similarly, referring in particular to table 3, the same throttle position change results in an increase of 904 Hp (1810 Hp to 2714 Hp) or approximately 50%. As noted above, due to these large step increases (and similar decreases), the operator may need to move back and forth between two throttle positions in order to maintain the desired speed of the locomotive.

It has been recognized that in most cases, there are several intermediate or transitional power options available for the consist between each bolded notch combination in table 4 and, thus, taking advantage of these combinations can give the operator finer control over the output of the consist 18. For example, there are four (4) intermediate or transitional power settings between notch 6 and notch 7. In particular, between lines 70 and 77, of the eight combinations, four pairs are identical as they are mirror images of each other, e.g. notch 3-notch 4 and notch 4-notch 3.

It has also been recognized from FIG. 3 that more fuel efficient combinations may be possible but would be overlooked by the controller 26 if the output horsepower does not fall within the range of acceptable horsepower output for the operator-selected throttle position. As such, taking advantage of these combinations can lead to even greater fuel efficiencies.

For example, making reference to FIG. 3, if the requested throttle setting is notch 5, the controller 26 would identify a targeted output horsepower of 3960 Hp (see table 2). Where the two locomotives 20, 22 are operated at the same notch position 16 (see line 52, FIG. 3), the efficiency of the consist 18 is approximately 18.5 horsepower hours produced per gallon of fuel consumed (Hp Hr/gallon). If the acceptable tolerance of horsepower output is, e.g., plus or minus 5%, then the combinations of throttle settings would need to be between 3762 Hp (target minus 5%) and 4158 Hp (target plus 5%).

Referring again to the table in FIG. 3, it is clear that there are combinations that do not fall within this tolerance range but have a higher fuel efficiency, such as the combinations on lines 44 and 45. The combinations in lines 44 and 45 (notch 1 and notch 7) can achieve a fuel efficiency of approximately 18.91 Hp Hr/gallon. However, if further flexibility is allowed, even higher efficiencies can be achieved by operating the consist 18 in the configuration defined by lines 42 and 43 (idle and notch 7). With this combination, the consist would achieve an efficiency of approximately 19.26 Hp Hr/gallon.

Accordingly, by taking advantage of the full range of throttle combinations available and utilizing a flexible tolerance range, a finer horsepower control can be achieved, as well as higher fuel efficiencies.

Figures 4, 5:
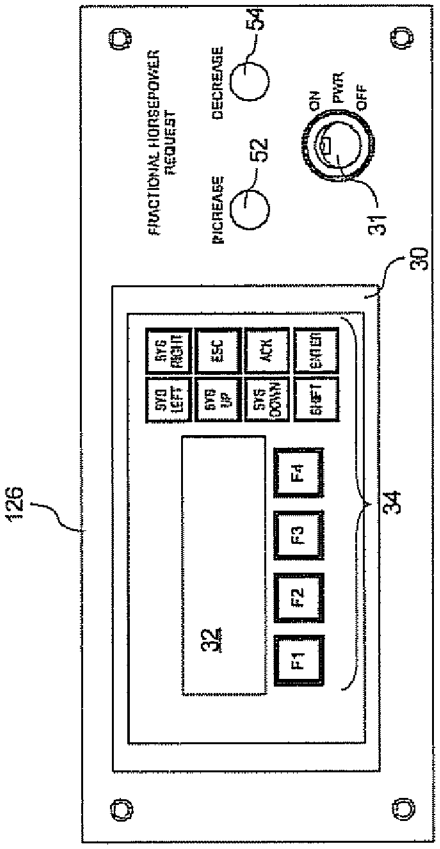
FIG. 4 is a schematic diagram of a consist controller.
FIG. 5 is an options display comprising a table of notch-combination options for an illustrative notch selection in the two-unit locomotive consist of FIG. 2.

In order to take advantage of the full range of throttle combinations, a consist controller 126 comprising a fractional horsepower request can be used as shown in FIG. 4. The controller 126 operates by separating the lead locomotive 20 from the trainline 24 and controlling the two locomotives (20, 22) as separate entities. The controller 126 comprises an operator interface 30, and a power button 31. The interface 30 comprises a display 32 and in this example, also comprises a series of function keys 34 for interacting with what is shown on the display 32 and for selecting options presented to the user. The display 32 is used to convey information to the user regarding the status of the consist 18 etc., and to request inputs or other information from the user, e.g., for set-up procedures.

The function keys 34 may provide directional/positional type functions or actuation functions. The operations performed by the function keys 34 shown in FIG. 4 may instead be effected using a keyboard, mouse, voice activation or touch sensitive elements and should not be considered limited to any particular arrangement. As such, it will be appreciated that the display 32 and keys 34 are shown and described for illustrative purposes only and that any interface and input mechanisms can instead be employed. For example, a touch sensitive screen could be used to provide input and display features. Similarly, the controller 126 could be operated using a standard computing device integrated into the leading locomotive 20 and trainline 24, such as a personal computer (PC), and foot activation, voice activation and any other input mechanism can also be used.

The interface 30 can be used by the operator to perform a set-up procedure where the operator establishes the models of the locomotives (20, 22) in the consist 18 so that the appropriate decisions can be made to, e.g. maximize the potential fuel efficiency. Once set up, the operator can perform his or her duties as normal. The controller 126 can direct the trainline 24 and lead locomotive 20 throttle positions 16 automatically, based on the horsepower targets associated with the chosen throttle handle position 16 (at the control stand 13), and the potential fuel efficiency improvements according to the table shown in FIG. 3 and, e.g. as described in the Nickles reference cited above.

The display 32 can be used to present to the operator the targeted horsepower as requested by the actual throttle position 16, as well as the actual horsepower being produced by the consist 18 based on the throttle settings for all locomotives in the consist 18.

In order to provide finer control over the horsepower output, in this example, a fractional increase button 52 and a fractional decrease button 54 are provided. The fractional increase button 52 can be used to request a fractionally higher horsepower than what is currently being output according to the controller's settings (and with respect to the difference between this value and that for the next throttle setting 16), and the fractional decrease button 54 can be used to request a fractionally lower horsepower. The result of the request would be an adjustment of the horsepower target that is used by the controller 126 by a requested incremental change, either up or down. It will be appreciated that the increase button 52 and decrease button 54 shown in FIG. 4 are shown as such in order to exemplify their respective functionalities and thus are intended to be illustrative only. The buttons 52, 54 may instead be implemented in and provided by the interface 30 described above, e.g. via display 32 (touch-sensitive or otherwise) and/or actuated using keys 34. Similarly, the buttons 52, 54 may be implemented using foot activation (e.g. pedals—not shown), voice activation and any other suitable input mechanism.

In this context, fractional increase and decrease refers to a step increase that would lie somewhere in between two consecutive notch positions. For illustrative purposes, the following examples use a "half" (½) fractional increase/decrease, however, it will be appreciated that any other fraction, and any number of corresponding fractional steps can be used to provide even finer horsepower control. The fractional increases and decreases can be used to avoid cycling up and down between notch positions 16, providing a smoother transition on ramp up or ramp down, selecting a better fuel efficiency, or any other reason where the operator would like to take advantage of the other combinations that can be achieved using the controller 126. It will be appreciated that any incremental change, whether or not a fractional step can also be used.

Figure 6:
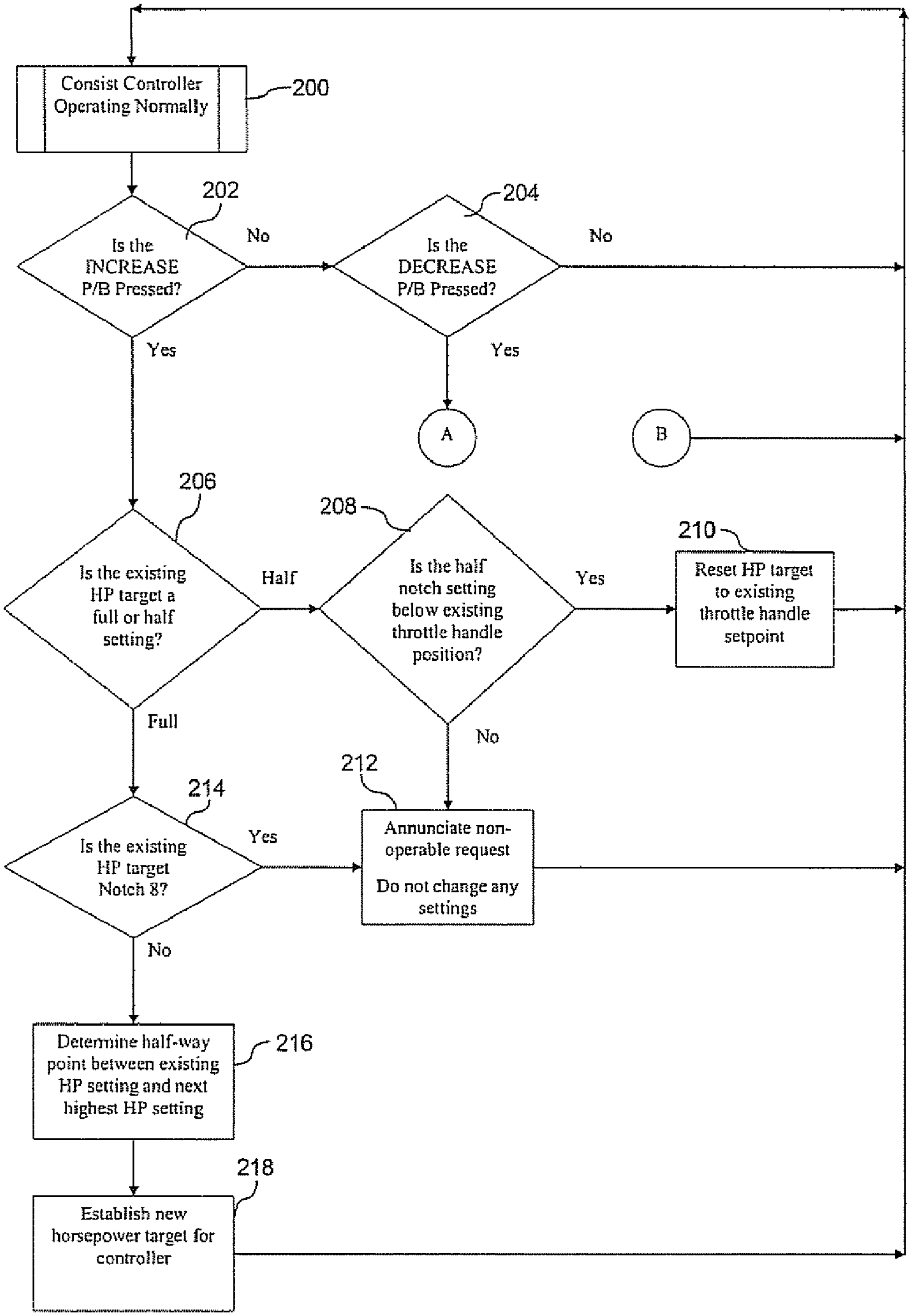
FIG. 6 is a flow chart illustrating control logic utilized by the consist controller of FIG. 4 for establishing an intermediate setpoint.
Figure 7:
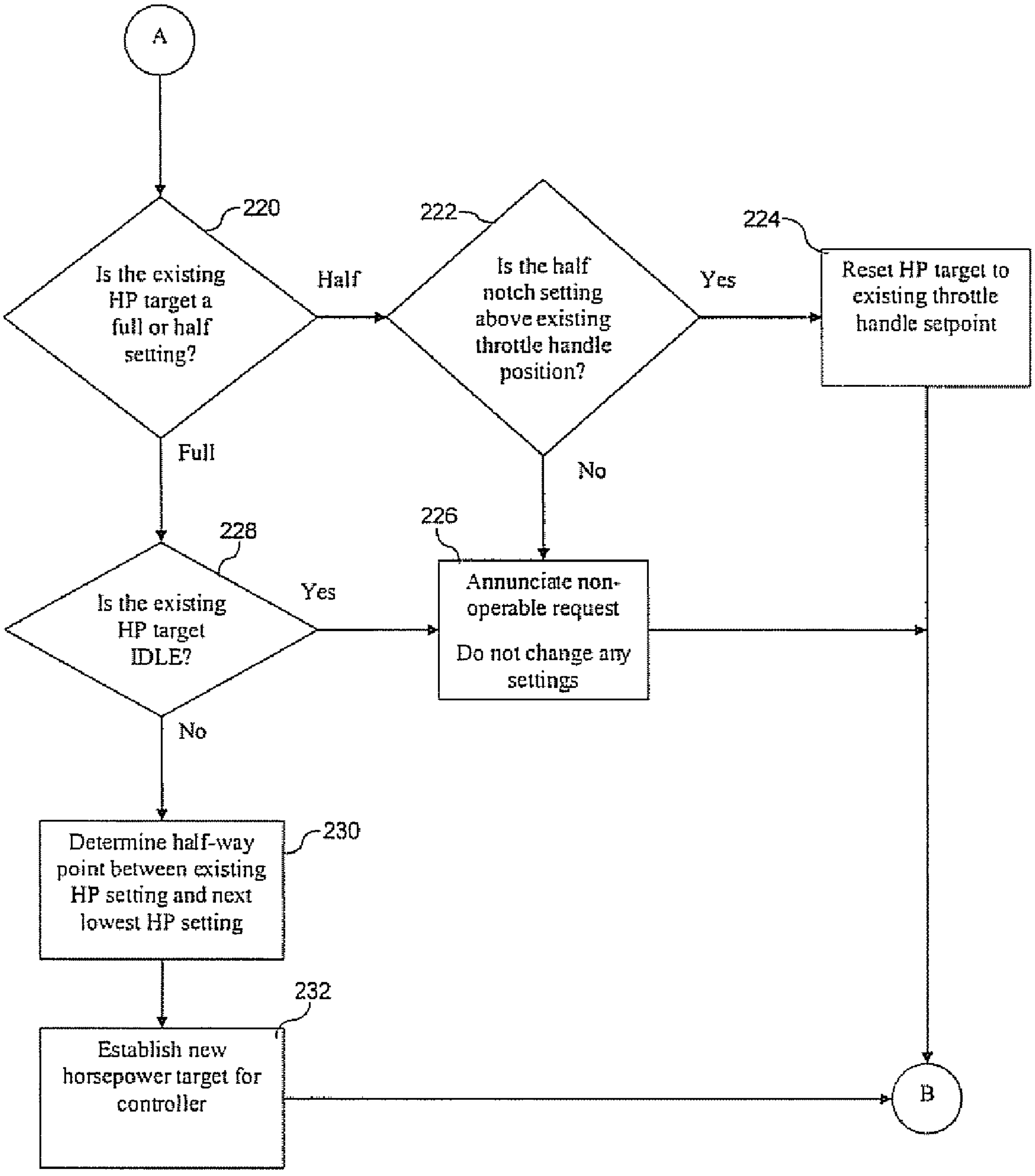
FIG. 7 is a flow chart continuing from the flow chart in FIG. 6.

Referring to FIGS. 6 and 7, flow diagrams are provided that illustrate the logic used by the controller 126 (e.g. by way of instructional steps in a computer-based algorithm) for effecting the fractional increases and decreases in horsepower described above, Referring first to FIG. 6, at step 200, the controller 126 is operating normally, which, in general, means that the controller 126 has either detected a newly selected throttle position 16, or is otherwise running according, to a fuel optimization mode etc. Preferably, whenever the throttle handle 12 is moved to a new position 16, the targeted horsepower setpoint is re-established by the new position, e.g. using predefined horsepower ranges and the table in FIG. 3 as discussed above. The display 32 would typically acknowledge the operator's request and identify or determine the actual or 'current' horsepower being produced and the throttle position or current notch position of each locomotive. The re-establishment of notch combinations by the controller 126 enables the fractional increase/decrease options to be easily integrated into the normal routine(s) run by the controller 126.

The controller 126, when operating normally, would then determine if the increase button 52 has been selected at step 202. If the increase button 52 has not been selected, then the controller 126 then determines if the decrease button 54 has been selected. If the decrease button 54 has not been selected, then the controller 126 determines that normal operations should resume. In general, normal operations occur until receiving an input indicative of a requested incremental change in horsepower, e.g. by way of selection of the buttons 52, 54. If the decrease button 54 has been selected, subroutine A is performed, which is shown in FIG. 7 and described later.

If instead the increase button 52 has been selected, the controller 126 then determines if the existing or current horsepower target is a full or fractional (e.g. half) setting at step 206. For example, if the increase or decrease buttons 52, 54 have already been chosen, then the horsepower target would have already been fractionally adjusted and, as such, would lie in between two consecutive notch settings 16, namely the current notch setting and a next notch setting. If the current horsepower target is a half setting, the controller 126 then determines if the "half-notch" setting (represented by fractional target) is below the existing throttle handle position at step 208. This would have occurred if, previously, the operator had selected a fractional decrease by selecting the decrease button 54. If the half setting is below the existing throttle position 16, then the target horsepower would be reset according to the throttle position 16 at step 210 and normal control resumes.

For example, with half notch settings, if the user first decreases the target to halfway between two notch settings to decrease horsepower, but later begins to climb a grade and needs more horsepower, the next highest "half-notch" is a regular notch position 16 and thus by pressing the increase button 52, the target for the selected notch position 16 is restored. This avoids the operator having to move the throttle handle 12 out of and then back into that desired notch position 16 to re-establish the normal target setpoint. It will be appreciated that both methods for resetting the target horsepower can preferably be used to accommodate either case.

At step 208, if the half notch setting is determined to not be below the existing throttle position 16, then an error message or alert is preferably provided at step 212 and no settings are changed. In this way, the operator is alerted when they are instead supposed to select the next throttle position 16 as they would have already increased the target for the selected notch setting 16. It will be appreciated that this step is preferable where physical control of the throttle handle 12 is required and, if automatic control of the throttle handle were to be permitted, the half notch settings could be used for fractional steps which would then include the normal full throttle settings 16.

If the existing throttle target is a full setting, then the controller 126 next determines if the existing notch position 16 is notch 8 at step 214. If the throttle position 16 is notch 8, then a similar alert is provided at step 212. Since notch 8 is the maximum horsepower, naturally, a step increase would not be permitted. If the notch position 16 is something other than notch 8, then the controller 126 next determines if the halfway (fractional) point between the existing horsepower setting and the next highest horsepower setting (the next notch in this example) at step 216. Once the half-way point is determined, the value is used to establish a new horsepower target for the controller at step 218.

Referring to FIG. 3, if the operator, e.g., is currently at notch 5, then at step 200 the controller 126 would determine the target horsepower to be 3960 Hp and the tolerance range for optimizing fuel efficiency would be 3762-4158 Hp (for +/−5% range). In this example, the controller 126 would choose the combination notch 2-notch 7 (or vice versa), which has an efficiency of 18.95 Hp Hr/gallon and output of 3772 Hp. This throttle combination has an output that is near the bottom end of the tolerated range. If the operator wishes to either ramp up or otherwise wishes to provide a slight, fractional increase in Hp, they can select the increase button 52 rather then selecting notch 6.

In this example using half notches, the current setpoint would be 3960 Hp and the next setpoint would be 5326 Hp if notch 6 were to be selected. The mid-point between these values is 4643 Hp (new target horsepower) and the new range for fuel optimization would be approximately 4410-4875 Hp. According to FIG. 3, if fuel efficiency is being optimized, then the notch combination notch 4-notch 7 (or vice versa) would be selected, with a corresponding output of 4724 Hp at an efficiency of 19.05 Hp Hr/gallon. The new output is thus in between the output when notch 5 is selected and the output when notch 6 is selected and a finer control is achieved. In general, the controller references a set of one or more transitional horsepower outputs at alternative or transitional notch combinations and determines a desired one of the alternatives that has a corresponding transitional horsepower output that is within the range of the new target or mid-point setpoint in this example.

Turning back to FIG. 6, at step 204, if the controller 126 determines that the decrease button 54 has been pressed by the operator, then sub-routine A is performed as shown in FIG. 7. As can be seen in FIG. 7, the controller 126 next determines if the existing horsepower target is a full or half setting in step 220, similar to step 206 in FIG. 6. If the existing setting, is a half setting, then, at step 222, the controller 126 then determines if the half notch setting is above the existing throttle handle position 16. If this is true, then at step 224 then controller 126 resets the horsepower target to the target for the existing throttle position 16. This may occur when, for example, the increase button 52 was previously selected thereby fractionally increasing the horsepower target but now the operator wishes to fractionally step back the horsepower. The controller 126 then returns to the routine in FIG. 6 at point B.

If at step 222 the controller determines that the half notch setting is in fact below the current throttle handle position 16, then an alert or error message is provided at step 226, similar to step 212 in FIG. 6. This would prompt the user to instead change the throttle handle position 16 to achieve a step decrease similar to what has been described above for the increase scenario in FIG. 6. Turning back to step 220, if the controller 126 determines that the existing target is a full target (corresponds to a notch position 16) then at step 228, the controller 126 then determines if the existing horsepower target is at the idle position 14. If the current notch is at the idle position 14 then, naturally, a further decrease cannot be achieved and an error or alert is provided at step 226.

When the throttle handle 12 is at any non-idle position 16, the controller 126 determines that a step decrease can be achieved and determines the half-way point between the existing horsepower setting and the next lowest horsepower setting at step 230, and establishes a new horsepower target for the controller 126 at step 232 similar (but opposite) to that described above for the fractional increase. Once the new target is set, the logic proceeds at point B to the main routine in FIG. 6 where normal operation resumes at step 200.

When the fuel efficiency is not being optimized, it is clear from the above principles that the half notch setting would select a new target of 4643 Hp (at a notch 2-notch 6 combination), which provides finer control than increasing output to 5326 Hp by selecting notch 6. Therefore, the operator is given the option of using a finer control, which can provide smoother transitions, utilize more fuel efficient combinations and avoid repeated cycling between notch positions 16 to balance a desired average speed. It will be appreciated that by providing additional fractional steps such as ¼, 2/4, ¾ or ⅓, ⅔ etc., even finer control can be achieved.

It will also be appreciated that the logic shown in FIGS. 6 and 7 would typically be stored as an executable algorithm in a memory or storage medium that can be accessed, loaded and run by the controller 126. The new targets established at steps 218 and 232 are preferably used by the controller 126 to generate commands/messages for the locomotives 20, 22 in the consist 18 and sent over the trainline 24 in order to individually operate each locomotive 20, 22. Typically, communication over the trainline 24 is according to standard protocols established in the locomotive industry but it will also be appreciated that the above principles can be adapted to any other protocol either current or yet to be implemented for the purposes of controlling locomotives 20, 22 in a consist 18.

As an additional feature, shown in FIG. 5, the controller 126 can present the full range of throttle combinations to the user using, e.g. the display 32. As can be seen from FIG. 5, the operator can at first glance compare the consist horsepower and corresponding fuel efficiency for each throttle combination and choose a particular combination that suits their current needs. For example, if a more accurate speed is most important, the operator can select the combination that is closest to a horsepower that would achieve that speed (determine by experience, knowledge, trial and error, feedback etc.). Similarly, if the most fuel efficient setting is desired, they may look for the highest fuel efficiency rating and select that notch combination even if the resulting output is not as close to the desired horsepower output as would be another combination. The operator may use the function keys 34 to highlight and select the desired throttle combination, by keying in an option number using a numerical keypad (not shown), using a touch sensitive screen (not shown), using voice activation, foot pedals or any other suitable input mechanism as discussed above with respect to FIG. 4.

In a preferred embodiment, the controller 126 provides both the increase/decrease buttons 52, 54 and the ability to select from all options as shown in FIG. 5 in any convenient interface arrangement. It will be appreciated that other visual and/or input aids can be used to assist the operator in making decisions and selecting a throttle combination and corresponding horsepower output.

Although the invention has been described with reference to certain specific embodiments, various modifications thereof will be apparent to those skilled in the art without departing from the spirit and scope of the invention as outlined in the claims appended hereto.

The invention claimed is:

1. A method for controlling horsepower output in a consist of at least two locomotives, each locomotive being controlled using a plurality of notch positions, said consist being controlled by said at least two locomotives according to a notch combination dictated by a physical notch position for a lead locomotive of said at least two locomotives, said method comprising:

during operation of said consist, receiving an input indicative of a requested incremental change in horsepower, said incremental change in horsepower being independent of a change in horsepower due to a change in said physical notch position for said lead locomotive;

determining a current horsepower output for said consist and a current notch combination for said at least two locomotives generating said current horsepower;

if said current notch combination is equivalent to one dictated by said physical notch position for said lead locomotive, determining a next notch combination for said at least two locomotives in the direction of said incremental change that would occur due to said change in physical notch position for said lead locomotive, said next notch combination having associated therewith, an expected horsepower output;

determining a target horsepower output which is between said expected horsepower output and said current horsepower output according to said direction of said incremental change;

referencing a set of one or more transitional horsepower outputs at alternative notch combinations and determining a desired one of said alternative notch combinations having a corresponding transitional horsepower output which is within a predetermined range of said target horsepower; and adjusting throttle notch positions in each said at least two locomotives according to said desired one of said alternative notch combinations.

2. The method according to claim 1 wherein said incremental change is a fractional value.

3. The method according to claim 2 wherein said direction of said incremental change is indicative of an increase in horsepower with a corresponding fractional increase or a decrease in horsepower with a corresponding fractional decrease.

4. The method according to claim 1 wherein said current notch combination and said next notch combination include a same notch setting for each said at least two locomotives.

5. The method according to claim 1 wherein said current notch combination and said next notch combination are set according to a fuel optimization routine that adjusts notch combinations to optimize fuel efficiency while producing horsepower output within a particular range of horsepower output expected according to said physical notch position.

6. The method according to claim 2 wherein said target horsepower is computed by determining a difference in horsepower between said expected horsepower and said current horsepower and applying said fractional value to said difference.

7. The method according to claim 1 wherein said alternative notch combinations comprise every possible notch combination for said at least two locomotives that produces a corresponding transitional horsepower output between said expected horsepower output and said current horsepower.

8. The method according to claim 2 wherein said fractional value is ½.

9. The method according to claim 3, further comprising first determining whether said incremental change is selected to be an increase or decrease in horsepower and then examining notch combinations above or below said current notch combination respectively.

10. The method according to claim 1, wherein if said current notch combination is resulting from a previous application of said incremental change, said method further comprising automatically setting said desired notch combination as said next notch combination.

11. A computer readable medium comprising computer executable instructions thereon for causing a processor in a control system to perform the method according to claim 1.

12. A system for controlling horsepower output in a consist of at least two locomotives, each locomotive being controlled using a plurality of notch positions, said consist being controlled by said at least two locomotives according to a notch combination dictated by a physical notch position for a lead locomotive of said at least two locomotives, said system comprising a controller connected to each said at least two locomotives, said controller being configured for controlling said plurality of notch positions for each said at least two locomotives, said controller comprising a processor configured to execute computer readable instructions to cause said controller to:

during operation of said consist, receive an input indicative of a requested incremental change in horsepower, said incremental change in horsepower being independent of a change in horsepower due to a change in said physical notch position for said lead locomotive;

determine a current horsepower output for said consist and a current notch combination for said at least two locomotives generating said current horsepower;

if said current notch combination is equivalent to one dictated by said physical notch position for said lead locomotive, determine a next notch combination for said at least two locomotives in the direction of said incremental change that would occur due to said change in physical notch position for said lead locomotive, said next notch combination having associated therewith, an expected horsepower output;

determine a target horsepower output which is between said expected horsepower output and said current horsepower output according to said direction of said incremental change;

reference a set of one or more transitional horsepower outputs at alternative notch combinations and determine a desired one of said alternative notch combinations having a corresponding transitional horsepower output which is within a predetermined range of said target horsepower, said set being accessible to said controller; and adjust throttle notch positions in each said at least two locomotives according to said desired one of said alternative notch combinations.

13. The system according to claim 12 comprising a control console for operating said controller, said control console having a display and at least one input device for entering said input to request said incremental change.

14. The system according to claim 12 wherein said incremental change is a fractional value.

15. The system according to claim 14 wherein said direction of said incremental change is indicative of an increase in horsepower with a corresponding fractional increase or a decrease in horsepower with a corresponding fractional decrease.

16. The system according to claim 12 wherein said current notch combination and said next notch combination include a same notch setting for each said at least two locomotives.

17. The system according to claim 12 wherein said current notch combination and said next notch combination are set according to a fuel optimization routine that adjusts notch combinations to optimize fuel efficiency while producing horsepower output within a particular range of horsepower output expected according to said physical notch position.

18. The system according to claim 14 wherein said target horsepower is computed by said processor determining a difference in horsepower between said expected horsepower and said current horsepower and applying said fractional value to said difference.

19. The system according to claim 12 wherein said alternative notch combinations comprise every possible notch combination for said at least two locomotives that produces a corresponding transitional horsepower output between said expected horsepower output and said current horsepower.

20. The system according to claim 14 wherein said fractional value is ½.

21. The system according to claim 15, wherein said processor is further configured to first determine whether said incremental change is selected to be an increase or decrease in horsepower and then examine notch combinations above or below said current notch combination respectively.

22. The system according to claim 12, wherein if said current notch combination is resulting from a previous application of said incremental change through operation of said controller on said consist, further configuring said controller for automatically setting said desired notch combination to said next notch combination.

* * * * *